US007957727B2

(12) United States Patent
Mazzara, Jr.

(10) Patent No.: US 7,957,727 B2

(45) **Date of Patent: *Jun. 7, 2011**

(54) TELEMATICS UNIT HAVING INTERACTIVE RADIO FEATURES

(75) Inventor: William E. Mazzara, Jr., Drayton Plains, MI (US)

(73) Assignee: General Motors LLC, Detroit, MI (US)

( * ) Notice: Subject to any disclaimer, the term of this patent is extended or adjusted under 35 U.S.C. 154(b) by 5 days.

This patent is subject to a terminal disclaimer.

(21) Appl. No.: 12/395,134

(22) Filed: Feb. 27, 2009

(65) Prior Publication Data

US 2009/0163194 A1 Jun. 25, 2009

Related U.S. Application Data

(63) Continuation of application No. 10/738,396, filed on Dec. 17, 2003, now Pat. No. 7,532,880.

(51) Int. Cl.
*H04M 3/00* (2006.01)

(52) U.S. Cl. ..................... 455/418; 455/569.2; 455/186; 455/420; 455/419; 455/425; 340/902; 340/905; 340/995; 701/207; 701/210; 701/211

(58) Field of Classification Search .................. 455/418, 455/404, 419, 569.2, 186, 420, 425; 340/5.72, 340/902, 905, 995; 701/207, 210–211

See application file for complete search history.

(56) References Cited

U.S. PATENT DOCUMENTS

| | | | | |
|---|---|---|---|---|
| 6,184,829 | B1 | 2/2001 | Stilp | |
| 6,282,491 | B1 * | 8/2001 | Bochmann et al. | 701/209 |
| 6,487,494 | B2 | 11/2002 | Odinak et al. | |
| 6,606,561 | B2 | 8/2003 | Flick | |
| 6,636,489 | B1 | 10/2003 | Fingerhut | |
| 6,711,474 | B1 | 3/2004 | Treyz et al. | |
| 6,782,264 | B2 | 8/2004 | Anderson | |
| 6,792,352 | B1 | 9/2004 | Hoffmann et al. | |
| 2002/0039904 | A1 | 4/2002 | Anderson | |
| 2002/0111715 | A1 | 8/2002 | Richard | |
| 2002/0137541 | A1 | 9/2002 | Lepley et al. | |
| 2002/0172223 | A1 | 11/2002 | Stilp | |
| 2003/0069032 | A1 | 4/2003 | Jarvi et al. | |
| 2003/0078722 | A1 | 4/2003 | Odinak et al. | |
| 2003/0143987 | A1 | 7/2003 | Davis et al. | |
| 2003/0186662 | A1 | 10/2003 | Himmel et al. | |
| 2003/0222819 | A1 | 12/2003 | Karr et al. | |
| 2004/0193343 | A1 * | 9/2004 | Tan et al. | 701/36 |
| 2005/0088318 | A1 * | 4/2005 | Liu et al. | 340/902 |
| 2005/0167172 | A1 | 8/2005 | Fernandez | |
| 2006/0095174 | A1 | 5/2006 | Sonnenrein et al. | |

* cited by examiner

*Primary Examiner* — Charles N Appiah

*Assistant Examiner* — Michael T Vu

(74) *Attorney, Agent, or Firm* — Leydig, Voit & Mayer, Ltd.

(57) ABSTRACT

The present invention provides a method for implementing interactive radio features within a telematics equipped mobile vehicle. The method includes receiving radio station information, detecting an initiation command received from a user interlace, and providing the radio station information to the telematics unit responsive to the detected initiation command. The radio station information may include a radio station message having a telephone number associated with a radio station advertiser. The method may further include receiving a communication command, and initiating a wireless communication via the telematics unit responsive to the received communication command.

15 Claims, 4 Drawing Sheets

TELEMATICS UNIT HAVING INTERACTIVE RADIO FEATURES

CROSS-REFERENCE TO RELATED APPLICATIONS

This patent application is a continuation of U.S. application Ser. No. 10/738,396 filed Dec. 17, 2003. All of the foregoing references are herein incorporated by reference for all that they teach without exclusion of any part thereof.

FIELD OF THE INVENTION

This invention relates generally to wireless communications with a mobile vehicle. More specifically, the invention relates to a method and system for implementing interactive radio features within a telematics equipped vehicle.

BACKGROUND OF THE INVENTION

The opportunity to utilize wireless features in a mobile vehicle is ever increasing as the automobile is being transformed into a communications and entertainment platform as well as a transportation platform. Wireless features include wireless vehicle communication, networking, maintenance and diagnostic services for a mobile vehicle.

Typically, conventional wireless systems within mobile vehicles (e.g. telematics units) provide voice communication. Recently, these wireless systems have been utilized to update systems within telematics units, such as, for example radio station presets. Other systems within mobile vehicles, such as, for example a power train control may be updated as well. Information may also be collected from systems and subsystems within mobile vehicles and provided to a vehicle manufacturer for analysis, such as, for example system usage, component wear, and the like.

The present invention advances the state of the art.

BRIEF SUMMARY OF THE INVENTION

One aspect of the invention includes a method for operating a telematics unit within a mobile vehicle including receiving radio station information, detecting an initiation command received from a user interface, and providing the radio station information to the telematics unit responsive to the detected initiation command.

In accordance with another aspect of the invention, a computer readable medium storing a computer program includes: computer readable code for sensing received radio station information; computer readable code for detecting an initiation command received from a user interface; and computer readable code for providing the radio station information to the telematics unit responsive to the detected initiation command.

In accordance with yet another aspect of the invention, a system for operating a telematics unit within a mobile vehicle is provided. The system includes means for receiving radio station information. Means for detecting an initiation command received from a user interlace is provided. Means for providing the radio station information to the telematics unit responsive to the detected initiation command is also provided.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE THE DRAWING(S)

DETAILED DESCRIPTION OF THE INVENTION

Figure 1:
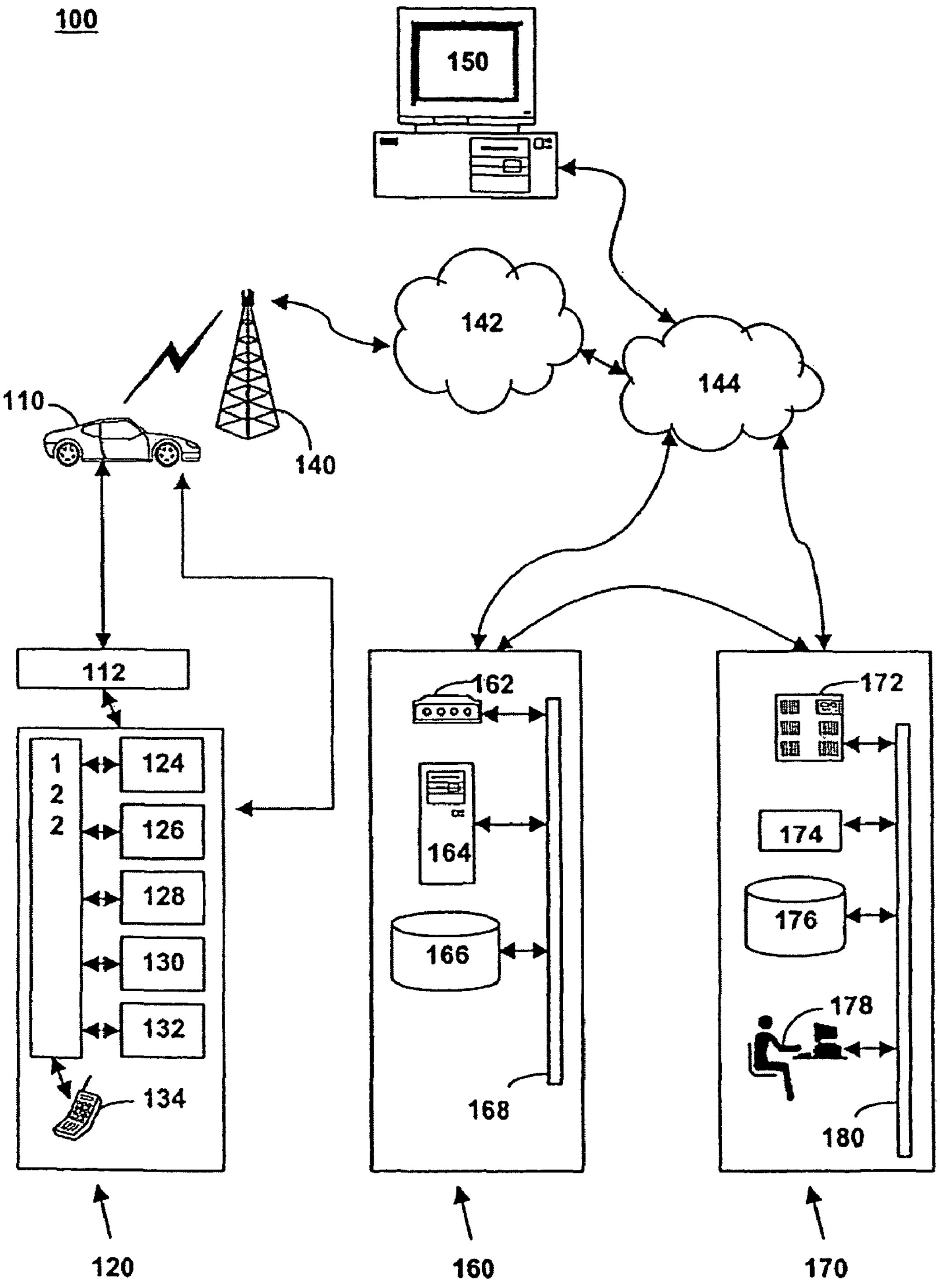
FIG. 1 illustrates an operating environment for implementing wireless communication within a mobile vehicle communication system.

FIG. 1 illustrates one embodiment of system for data transmission over a wireless communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 may also be referred to as a mobile vehicle throughout the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141. ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as ally suitable system for transmitting a signal from MVCU 110 to communication network 142.

Telematics unit 120 includes a digital signal processor (DSP) 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components, such as, for example GPS unit 126 or speakers 132. Telematics unit 120 may include additional components not relevant to the present discussion.

In one embodiment, DSP 122 is implemented as a microcontroller, microprocessor, controller, host processor, or vehicle communications processor. In an example, DSP 122 is implemented as an application specific integrated circuit (ASIC). In another embodiment, DSP 122 is implemented as a processor working in conjunction with a central processing unit (CPU) performing the function of a general purpose processor. GPS unit 126 provides longitude and latitude coordinates of the vehicle responsive to a GPS broadcast signal received from a one or more GPS satellite broadcast systems (not shown). In-vehicle mobile phone 134 is a cellular-type phone, such as, for example an analog, digital, dual-mode, dual-band, multi-mode or multi-band cellular phone.

DSP 122 executes various computer programs that control programming and operational modes of electronic and mechanical systems within MVCU 110. DSP 122 controls communications (e.g. call signals) between telematics unit 120, wireless carrier system 140, and call center 170. In one embodiment, a voice-recognition application is installed in DSP 122 that can translate human voice input through microphone 130 to digital signals. DSP 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers. In this embodiment, signals from DSP 122 are translated into voice messages and sent out through speaker 132.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150. web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user-preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and from modem 162. data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network

144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g. a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

Figure 2:
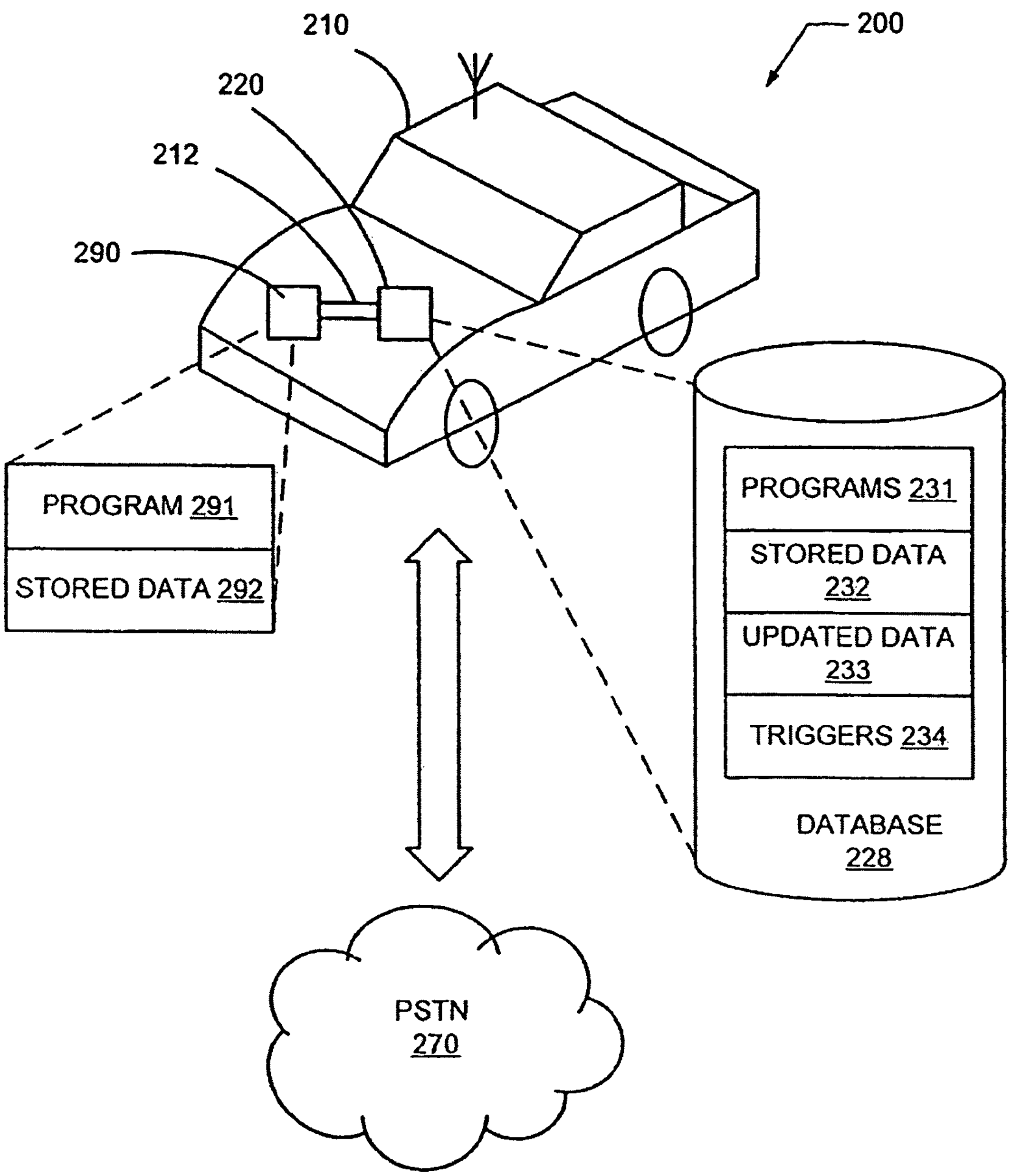
FIG. 2 is a block diagram of telematics based programming gateway in accordance with an embodiment of the present invention.

FIG. 2 is a block diagram of a telematics based system in accordance with an embodiment of the present invention. FIG. 2 shows a telematics based system 200 for implementing interactive radio features within a telematics equipped mobile vehicle. In FIG. 2, the telematics system includes a mobile vehicle 210 having a telematics unit 220 coupled to one or more vehicle system modules 290 via a vehicle communication bus 212, and a communication network 270, such as, for example a wireless carrier system (FIG. 1, 140), and a communication network (FIG. 1, 142) in communication with a public switched telephone network (PSTN). Telematics unit 220 further includes a database 228 that contains programs 231, stored data 232, updated data 233 and triggers 234 Vehicle system module (VSM) 290 further includes a program 291 and stored data 292. Telematics based programming gateway system 200 may include additional components not relevant to the present discussion.

Vehicle system module 290 is any vehicle system control module having software and hardware components for operating, controlling or monitoring one or more vehicle systems. In one embodiment, vehicle system module 290 is a radio receiver, such as, for example a radio receiver capable of receiving radio transmissions including frequency modulated (FM) signals that incorporate an FM sub-carrier signal as is known in the art. In another embodiment, vehicle system module 290 is a controller for controlling a vehicle system such as, for example, a power train control module (PCM). Additional examples of vehicle system modules 290 include diagnostic modules, brake system modules, fluid level modules, fuel consumption monitoring modules, pollution control modules, stability control modules, climate control modules, and the like.

Vehicle system module 290 contains one or more processors, one or more memory devices and one or more connection ports. In one embodiment, VSM 290 includes a software switch for scanning received information to identify that data has been received. VSM 290 is coupled to a vehicle communication bridge 212, and therefore to any other device that is also coupled to vehicle communication bus 212. The vehicle communication bus is also referred to as a vehicle communication network. In one embodiment, VSM 290 is directly coupled to telematics unit 220, such as, for example vehicle communication bus 212 coupling telematics unit 220 to vehicle system modules 290. In an example, vehicle communication bus 212 is a vehicle communication network 112 as described in FIG. 1. above. In another embodiment, VSM 290 is indirectly coupled to telematics unit 220.

VSM 290 includes one or more programs 291 and stored data 292 stored in memory. In one embodiment, program 291 includes software for receiving radio station information and storing the received radio station information at stored data 292. In another embodiment, program 291 includes software for receiving radio station information, storing a portion of the received radio station information at stored data 292, and passing a portion of the received radio station information to telematics unit 220 via communication bus 212.

Examples of radio station information include radio station identification, radio station telephone number, and one or more radio station messages. Other examples include weather, sports scores, stock quotes and alert information including traffic hotline reports, government emergency alerts, and weather alerts. In an example, program 291 receives the radio station information and stores all of the received radio station information at stored data 292. In another example, program 291 receives the radio station information, stores the radio station identification and one or more radio station messages for display (detailed in FIG. 3 below) at stored data 292, and passes the radio station telephone number to telematics unit 220 via communication bus 212.

Telematics unit 220 is any telematics device enabled for operation with a telematics service provider, such as, for example telematics unit 120 as described with reference to FIG. 1. Telematics unit 220 in vehicle 210 is in communication with communication network 270. Telematics unit 220 includes volatile and non-volatile memory components for storing data and programs. In one embodiment, memory components in telematics unit 220 contain database 228.

Database 228 includes one or more programs 231 for operating telematics unit 220, such as, for example, for implementing interactive radio features within a telematics equipped mobile vehicle. A program module receives radio station information from VSM 290 at updated data 233. In an example, the radio station information is cached within updated data 233. The radio station information is stored at stored data 232. In one embodiment, telematics unit 220 acts as a data cache for radio station information, caching any received radio station information that is provided to vehicle system module 290 for the telematics unit 220.

In operation, VSM 290, such as, for example a radio receiver including an interactive interface (detailed in FIG. 3 below) receives radio station information. In one embodiment, the radio station information is broadcast on a frequency modulated (FM) sub-carrier band. VSM 290 detects whether an initiation command has been received from the user interface portion. In one embodiment, the user interface is a voice activated user interface. In another embodiment, the user interface is manually operable push button user interface.

When the initiation command has been received, VSM 290 provides the radio station information, such as, for example a radio station telephone number to telematics unit 220 responsive to the detected initiation command. Telematics unit 220 acts accordingly based on the provided radio station information and discussed in FIG. 3, below.

In one embodiment, VSM 290 receives a communications command and passes the communications command to telematics unit 220. Telematics unit 220 initiates a wireless communication with communication network 270 (e.g. a "PSTN") responsive to the received communication command.

Figure 3:
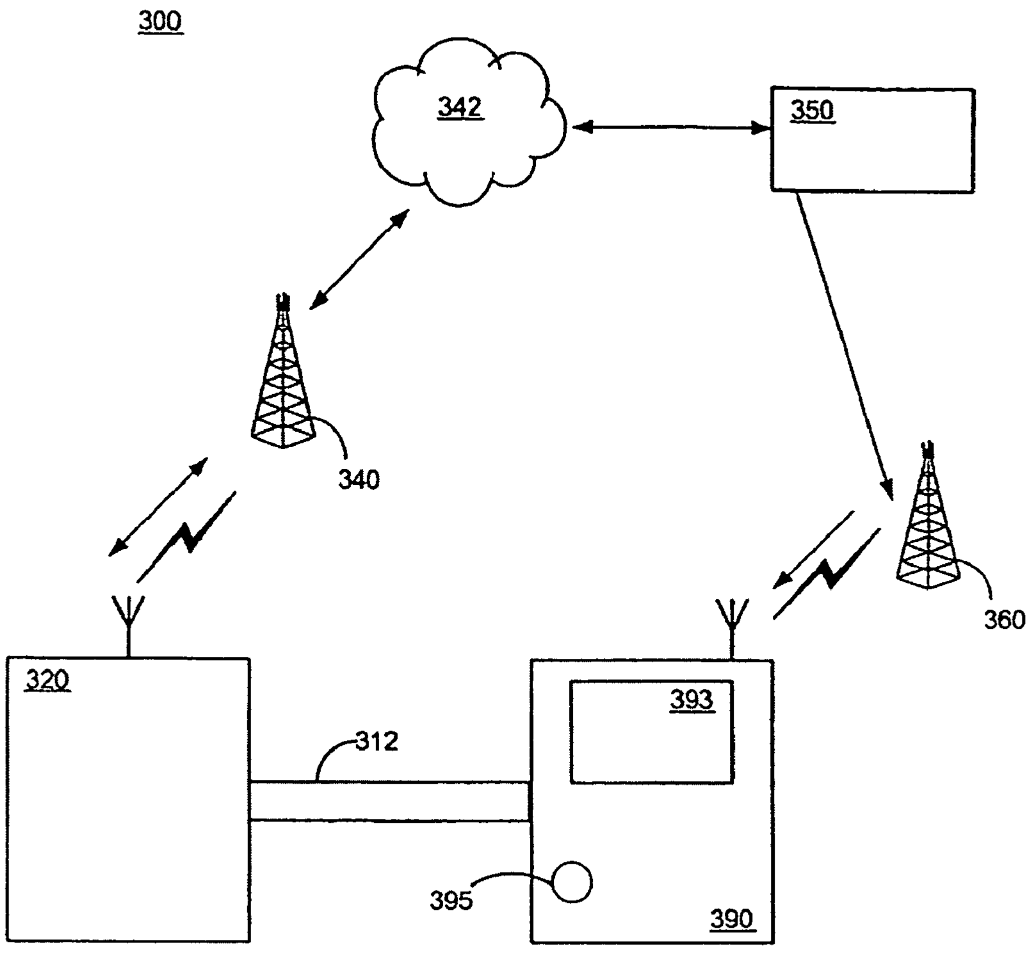
FIG. 3 is a block diagram of a system for implementing interactive radio features within a telematics equipped mobile vehicle.

FIG. 3 is a block diagram of a system for implementing interactive radio features within a telematics equipped mobile vehicle. In FIG. 3, the interactive radio system 300 includes a telematics unit 320 coupled to interactive radio module 390 via a vehicle communication bus 312, one or more wireless carrier systems 340, one or more communication networks 342, one or more client centers 350, and one or more transmitter systems 360. Interactive radio module 390 further includes a visual user interface 393 portion and a physical user interface 395 portion. Interactive radio system 300 may include additional components not relevant to the present discussion.

Telematics unit 320 is any telematics device enabled for operation with a telematics service provider, such as, for example telematics unit 120 as described with reference to FIG. 1 and telematics unit 220 as described with reference to FIG. 2. Communication network 342 (e.g. a "PSTN") connects wireless carrier system 340 to client center 350 (e.g. a radio station). Communication network 342 is implemented as any suitable system or collection of systems, such as, for example communication network 342 as described with reference to FIG. 1.

Transmitter system 360 is any transmitter system enabled for transmitting a modulated signal, such as, for example a frequency modulated (FM) or an amplitude modulated (AM) signal including a sub-carrier band, such as, for example a frequency modulated (FM) sub-carrier band. Transmitter system 360 provides a modulated signal from client center 350 that is received by interactive radio module 390, such as, for example an interactive radio receiver. In one embodiment, interactive radio module 390 is implemented as VSM 290 as described with reference to FIG. 2.

Interactive radio module 390 is any interactive radio receiver that includes visual user interface 393 and physical user interface 395. Visual user interface 393 is any visual user interface, such as, for example a visual display. Physical user interface 395 is any physical user interface, such as, for example a manually operable push button user interface. Visual displays and physical user interfaces within a radio receiver are known in the art.

Interactive radio module 390 is capable of receiving radio station information, such as, for example from client center 350 via transmitter system 360. Examples of radio station information include radio station identification, radio station telephone number, and one or more radio station messages. Other examples include weather, sports scores, stock quotes and alert information including traffic hotline reports, government emergency alerts, and weather alerts. In one embodiment, interactive radio module 390 stores the received radio station information and displays radio station identification via visual user interface 393. In another embodiment, interactive radio module 390 receives the radio station information, stores the radio station identification and one or more radio station messages for display, and passes the radio station telephone number to telematics unit 320 via communication bus 312.

Interactive radio module 390 receives commands from physical user interface 395. Examples of commands interactive radio module 390 receives from physical user interface 395 include an initiation command and a communication command. In one embodiment, interactive radio module 390 receives an initiation command from physical user interface 395. In this embodiment, the initiation command is an indication that a user wants to have one or more radio station messages displayed as well as initiating programming associated with the one or more displayed radio station messages. Examples of radio station messages include radio station contests, alert data such as traffic hotline reports, and government emergency alerts. When interactive radio module 390 receives an initiation command from physical user interface 395, the radio station messages are displayed to a user via visual user interface 393 and passes the radio station telephone number to telematics unit 320 via communication bus 312.

In another embodiment, after interactive radio module 390 receives the initiation command from physical user interface 395, interactive radio module 390 further receives a communication command from physical user interface 395. In this embodiment, the communication command is an indication that a user wants to communicate with client center 350 in response to the one or more displayed radio station messages, such as, for example to respond to a radio station contest message displayed via visual user interface 393.

In yet another embodiment, physical user interface 395 is implemented as a voice activated user interface. In this embodiment, the voice activated user interface performs interface functions as described and attributed to physical user interface 395, above.

Figure 4:
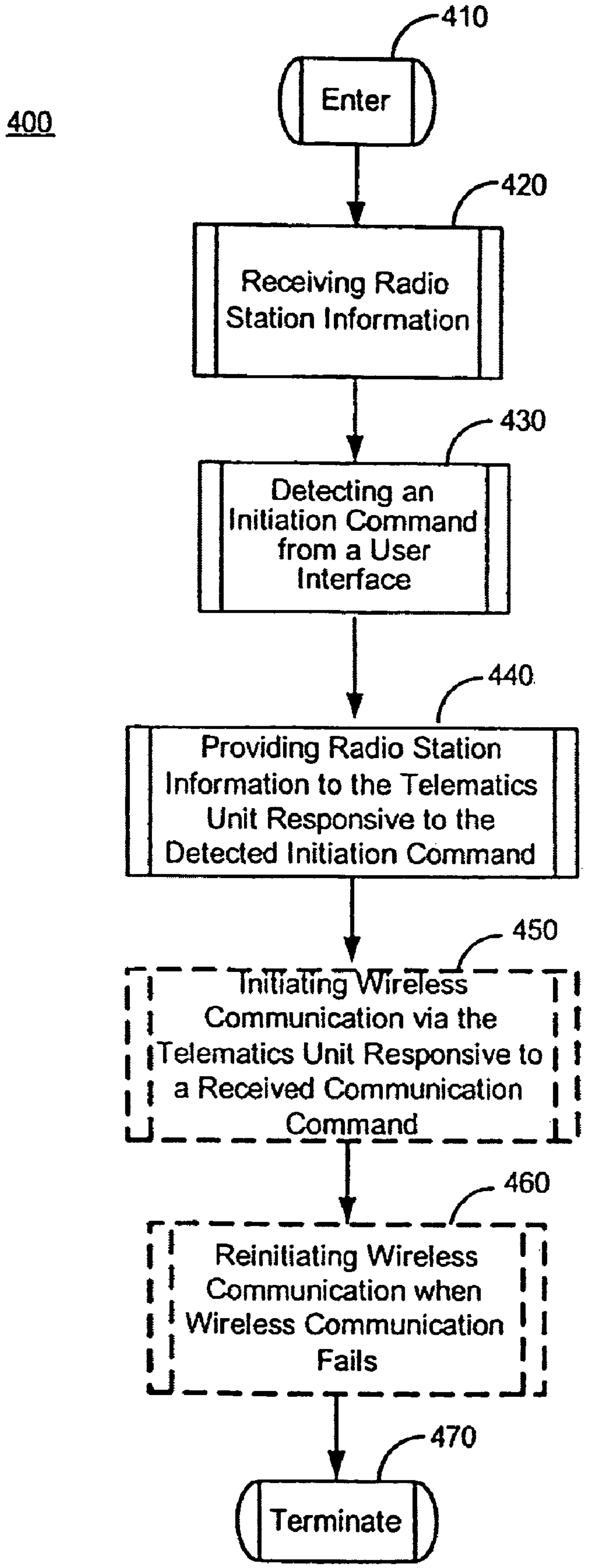
FIG. 4 is a flow diagram of one embodiment of a method of implementing interactive radio features within a telematics equipped mobile vehicle, in accordance with the present invention.

FIG. 4 is a flow diagram of an embodiment of a method of implementing interactive radio features within a telematics equipped mobile vehicle. In FIG. 4, method 400 may utilize one or more systems detailed in FIGS. 1-3, above. The present invention can also take the form of a computer usable medium including a program for configuring an electronic module within a vehicle. The program stored in the computer usable medium includes computer program code for executing the method steps described in FIG. 4. In FIG. 4, method 400 begins at step 410.

At step 420, radio station information is received at an interactive radio module. Examples of radio station information include radio station identification, radio station telephone number, and one or more radio station messages. Other examples include weather, sports scores, stock quotes and alert information including traffic hotline reports, government emergency alerts, and weather alerts. In one embodiment, receiving radio station information includes receiving the radio station information and storing the received radio station information. In an example and referring to FIG. 3 above, interactive radio module 390 receives radio station information from client center 350 (e.g. a radio station) via transmitter system 360. In this example and referring to FIG. 2 above, VSM 290 (e.g,. a radio receiver) receives the radio station information and stores the received radio station information at stored data 292.

At step 430, an initiation command received at the interactive radio module from a user interface is detected. In one embodiment, the user interface is a voice activated user interface. In another embodiment, the user interface is manually operable push button user interface. In one embodiment, an interactive radio module receives the initiation command from a physical user interface. In an example and referring to FIG. 3 above, interactive radio module 390 receives the initiation command from physical user interface 395.

At step 440, radio station information is provided to the telematics unit responsive to the detected initiation command. In one embodiment, an interactive radio module provides radio station information to a telematics unit. In an example and referring to FIG. 3 above, interactive radio module 390 provides radio station information, such as, for example a radio station telephone number to telematics unit 320.

At optional step 450, a communication command is received at an interactive radio module from the user interface and a wireless communication (e.g. a voice telephone call) via the telematics unit is initiated responsive to the received communication command. In one embodiment, the interactive radio module receives the communication command from the physical user interface responsive to information displayed on a visual user interface and passes the communication command to the telematics unit to initiate the wireless communication between the telematics unit and a client center.

In an example and referring to FIG. 3 above, the interactive radio module 390 receives the communication command from the physical user interface 395 responsive to information displayed on a visual user interface 393 and passes the communication command to the telematics unit 320 to initiate the wireless communication between the telematics unit 320 and a client center 350. In this example, a radio station may include radio station contest information within the radio station information as one or more radio station messages. The contest information is displayed on the visual user interface prompting a user to "call in". The user may then activate a "call in" procedure by accessing the physical user interface.

In another embodiment, optional step 450 is modified so as to remove the portion of reception of the communication command. In this embodiment, upon reception of information displayed on the visual interface, an instruction is passed to the telematics unit to initiate the wireless communication (e.g. a voice telephone call) between the telematics unit and the client center.

At optional step 460, wireless communication is reinitiated when wireless communication fails. In one embodiment, wireless communication is reinitiated by determining if the initiated wireless communication is connected, initiating wireless voice communication from a user interface (e.g. the telematics unit) when the initiated wireless communication is connected, terminating the wireless communication when the initiated wireless communication is not connected, and reinitializing the terminated wireless communication via the telematics unit responsive to the received communication command. In this embodiment, the wireless communication is reinitiated until the initiated wireless communication is connected. In an example, the wireless communication is (e.g. a voice telephone call) reinitiated when wireless communication fails with a redial feature as is known in the art.

At step 470, the method ends.

The above-described methods and implementation for implementing interactive radio features within a telematics equipped mobile vehicle are example methods and implementations. These methods and implementations illustrate one possible approach for implementing interactive radio features within a telematics equipped mobile vehicle. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

The invention claimed is:

1. A method for operating a telematics unit within a mobile vehicle having a radio module comprising a radio module user interface, the method comprising:

receiving radio station information including a radio station message at the radio module;

detecting an initiation command received from the radio module user interface; and providing the radio station information from the radio module to the telematics unit responsive to the detected initiation command;

wherein the radio station information is received at the radio module via a sub-carrier band of a radio signal, and wherein the radio station message includes a telephone number associated with an advertiser on the radio station, and wherein the initiation command is received responsive to a radio station broadcast, and wherein the telephone number is passed to the telematics unit via a communication bus responsive to the initiation command.

2. The method of claim 1, further comprising:

receiving a communication command; and initiating a wireless communication via the telematics unit responsive to the received communication command.

3. The method of claim 2, further comprising:

determining if the initiated wireless communication is connected;

initiating wireless voice communication from a user interface when the initiated wireless communication is connected and terminating the wireless communication when the initiated wireless communication is not connected; and reinitializing the terminated wireless communication via the telematics unit responsive to the received communication command if the initiated wireless communication is not connected.

4. The method of claim 1, further comprising:

initiating a wireless communication via the telematics unit responsive to the detected initiation command.

5. The method of claim 1, wherein the radio module user interface is a voice activated user interface.

6. The method of claim 1, wherein the radio module user interface is manually operable push button user interface.

7. A system for operating a telematics unit within a mobile vehicle having a radio module comprising a radio module user interface, the system comprising:

means for receiving radio station information at the radio module, wherein the radio station information includes a radio station message;

means for detecting an initiation command received from the radio module user interface; and means for providing the radio station information from the radio module to the telematics unit responsive to the detected initiation command;

wherein the radio station information is received at the radio module via a sub-carrier band of a radio signal and wherein the radio station message includes a telephone number associated with an advertiser on the radio station, and wherein the initiation command is received responsive to a radio station broadcast, and wherein the telephone number is passed to the telematics unit via a communication bus responsive to the initiation command.

8. A method for operating a telematics unit within a mobile vehicle having an interactive radio module comprising a radio module user interface, the method comprising:

receiving radio station information at the interactive radio module, wherein the radio station information includes a radio station message;

detecting an initiation command received from the interactive radio module user interface; and providing the radio station information from the interactive radio module to the telematics unit responsive to the detected initiation command wherein the radio station information is received at the interactive radio module via a sub-carrier band of a radio signal;

wherein the radio station message includes a telephone number associated with an advertiser on the radio station, and wherein the initiation command is received responsive to a radio station broadcast, and wherein the telephone number is passed to the telematics unit via a communication bus responsive to the initiation command.

9. The method of claim 8 wherein the interactive radio module includes a visual user interface and a physical user interface and is configured to receive commands from the physical user interface and store received radio station information.

10. A computer-readable medium having thereon computer-executable instructions for operating a telematics unit within a mobile vehicle having a radio module comprising a radio module user interface, the computer-executable instructions comprising:

instructions for receiving radio station information including a radio station message at the radio module;

instructions for detecting an initiation command received from the radio module user interface; and instructions for providing the radio station information from the radio module to the telematics unit responsive to the detected initiation command;

wherein the radio station information is received at the radio module via a sub-carrier band of a radio signal, and wherein the radio station message includes a telephone number associated with an advertiser on the radio station, and wherein the initiation command is received responsive to a radio station broadcast, and wherein the telephone number is passed to the telematics unit via a communication bus responsive to the initiation command.

11. The computer-readable medium of claim 10, wherein the computer-executable instructions further comprise:

instructions for receiving a communication command; and instructions for initiating a wireless communication via the telematics unit responsive to the received communication command.

12. The computer-readable medium of claim 11, the computer-executable instructions further comprising:

instructions for determining if the initiated wireless communication is connected;

instructions For initiating wireless voice communication from a user interface when the initiated wireless communication is connected and terminating the wireless communication when the initiated wireless communication is not connected; and instructions for reinitializing the terminated wireless communication via the telematics unit responsive to the received communication command if the initiated wireless communication is not connected.

13. The computer-readable medium of claim 10, the computer-executable instructions further comprising:

instructions for initiating a wireless communication via the telematics unit responsive to the detected initiation command.

14. The computer-readable medium of claim 10, wherein the radio module user interface is a voice activated user interface.

15. The computer-readable medium of claim 10, wherein the radio module user interface is manually operable push button user interface.

* * * * *